United States Patent [19]

Brantly

[11] 4,148,453
[45] Apr. 10, 1979

[54] PROJECTOR STACKING STAND

[76] Inventor: Robert T. Brantly, 2504 Parkway Pl., Burnsville, Minn. 55337

[21] Appl. No.: 858,730

[22] Filed: Dec. 8, 1977

[51] Int. Cl.² ............................................. F16M 11/32
[52] U.S. Cl. ..................................... 248/660; 211/13
[58] Field of Search ............... 248/122, 124, 181, 179, 248/183, 11; 108/4; 211/13, 168, 175

[56] References Cited

U.S. PATENT DOCUMENTS

| | | | |
|---|---|---|---|
| 590,636 | 9/1897 | Walter | 248/181 |
| 1,230,819 | 6/1917 | Gall | 248/11 |
| 1,460,344 | 6/1923 | Kager | 248/183 X |
| 1,489,934 | 4/1924 | Eklund | 248/122 X |
| 2,311,668 | 2/1943 | Kennedy | 248/122 X |
| 2,579,348 | 12/1951 | Taylor | 108/4 UX |
| 3,099,934 | 8/1963 | Park | 248/11 X |
| 3,156,196 | 11/1964 | Hood | 108/4 |
| 3,421,457 | 1/1969 | Taylor et al. | 108/4 |
| 3,586,278 | 6/1971 | Simons | 248/183 X |
| 3,752,429 | 8/1973 | Reed | 248/179 |

OTHER PUBLICATIONS

"Buhl Stacker".

Primary Examiner—J. Franklin Foss
Attorney, Agent, or Firm—Merchant, Gould, Smith, Edell, Welter & Schmidt

[57] ABSTRACT

A stacking stand for adjustably supporting at least one visual image projection device relative to a screen. The stacking stand comprises a support member and a support frame for carrying the projection device. The support frame is pivotably mounted on the support member by a ball and socket pivot joint located near the center of mass of the projection device. The pivot joint allows rotation of the support frame about pitch, roll and yaw axes. In addition, fastening means are provided for locking the support frame relative to the support member in various adjusted positions along the pitch, roll and yaw axes. Thus, an image projected by the projection device onto the screen may be superimposed with a target area on the screen by a rotary adjustment of the projection device along the pitch, roll and yaw axes.

15 Claims, 8 Drawing Figures

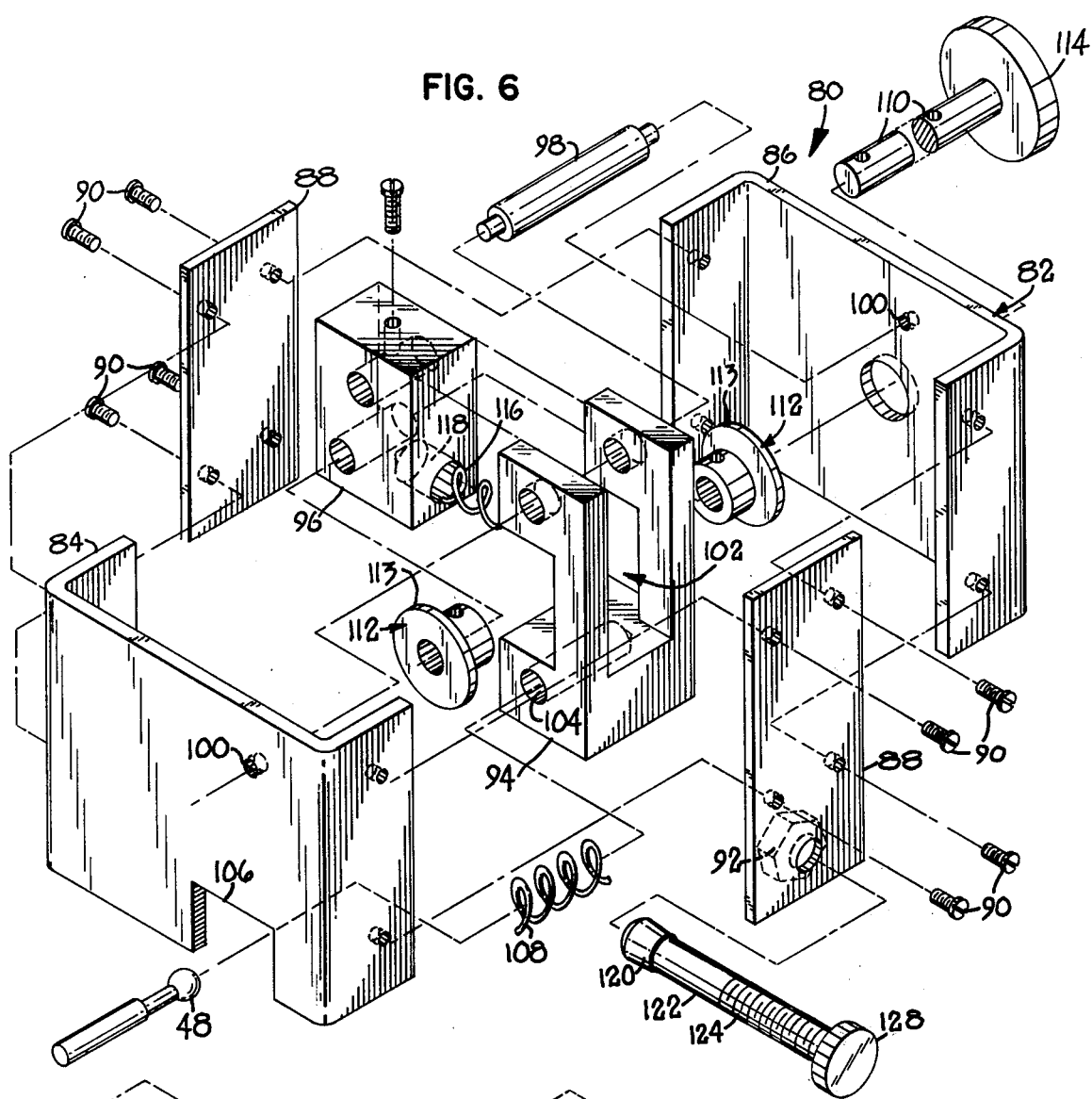
FIG. 6
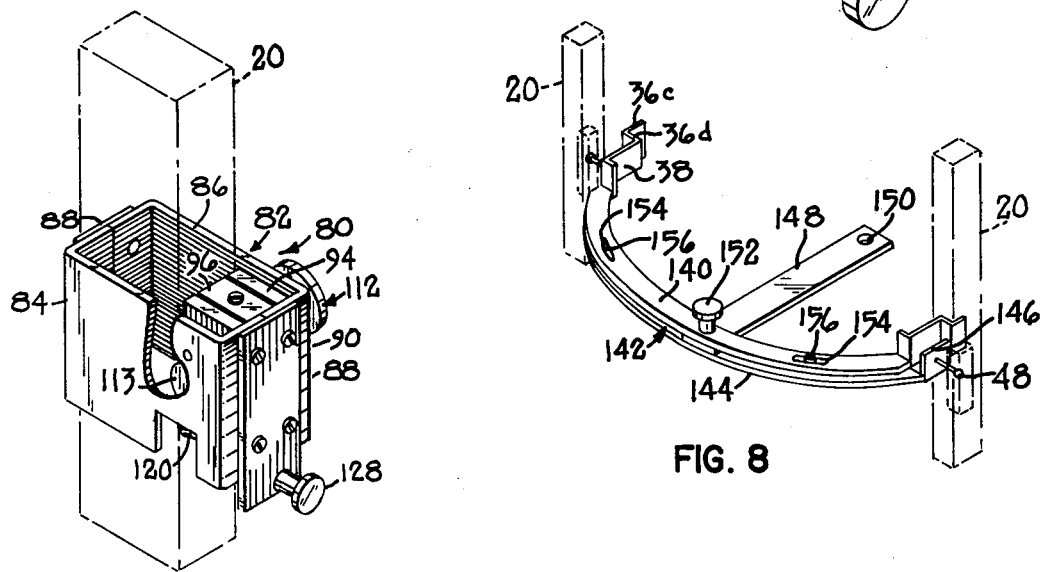
FIG. 7
FIG. 8

PROJECTOR STACKING STAND

BACKGROUND OF THE INVENTION

1. Field of the Invention

The present invention comprises an apparatus for supporting a visual image projection device. An aspect of the present invention is a stacking stand which adjustably supports a slide projector for rotation in three degrees of freedom to align an image projected by the slide projector with a target image or area.

2. Description of the Prior Art

Audio-visual presentations are widely used for many purposes. Such presentations often include what is commonly referred to as "slide shows" or the like, i.e. visual depiction of information and images contained on slides by means of slide projectors having a light projecting lamp. Such "slide shows" are often used for business, education and othe related communication purposes. The slides in this kind of presentation primarily depict information of value to the audience from an informational or educational standpoint. However, such presentations are made more effective if they simultaneously entertain or please the audience.

Historically, slide presentations involved a single projector which projected slides alternately onto a screen. In such an arrangement, intervals of no light appeared on the projection screen while the projector automatically advanced to the next slide. In recent years, however, "dissolve" presentations utilizing two projectors focused on a single screen have become popular. The lamps of the projectors in a dissolve presentation are controlled by a control unit for alternately projecting images from the projectors onto the screen. The control unit also serves to dissolve the images from one of the projectors, i.e. fade the image out, as the image from the other projector is brought up on the screen. Thus, a viewer sees the image on the screen change before his very eyes in a smooth sequence without any intervening break or dark interval on the screen. It is not uncommon in such presentations to utilize a plurality of screens each having more than one projector focused on it. For example, dissolve presentations utilizing up to ten screens are not unusual. These multi-screen presentations are also known by the term "multi-image" presentations.

It is a major problem in dissolve presentations to keep the plural images appearing on the screen aligned or superimposed with one another. In this regard, it is extremely important that the projectors be adjustably and firmly supported to achieve proper alignment of their images. Since the projectors are often located at extremely large distances from the screen, a small error or deviation at the projector results in a large error or deviation of the image on the screen. Thus, the support member for the projectors must be capable of precisely positioning the projectors relative to the screen. Such a support member should also be simple and easy to operate since the set-up and dismantling of a multi-image presentation is complex and difficult.

Various prior art products have been developed for adjustably supporting a plurality of projectors relative to a screen to allow alignment of their images. One such type of prior art stands is generically known as "piggyback" stands. In such stands, the first projector is placed on a table or other flat surface in a position where it projects a target image onto the screen. A piggy-back stand is provided having a plurality of feet which support a mounting bracket on which the second projector is mounted. The second projector is positioned by the stand above the level of the first projector. The piggyback stand is then manually moved horizontally to adjust the yaw position of the second projector. Thereafter, the projectors leveling feet are moved to adjust the pitch and roll positions of the projector to achieve alignment of the images on the screen.

One disadvantage of piggy-back stands is that they are dificult to adjust to achieve image alignment. Since the alignment of the stands is basically done manually, i.e. by simply moving the stand and the projectors own controls until the second projector supported thereon has its image aligned with the target image, it is difficult to precisely adjust such a device. In addition, a piggyback stand, if jostled or otherwise moved, will easily lose its image alignment. This requires a lengthy readjustment and realignment of the second projector.

Other prior art projector stands are known which allow a more precise adjustment of the projector while also maintaining that adjustment to a greater degree than is possible with "piggy-back" stands. One such stand is known which allows for adjustment of the projector along three mutually perpendicular axes, i.e. along pitch, roll and yaw axes. However, this stand as previously known exhibits a number of problems. It is often extremely difficult to adjust for a number of reasons. First, the projector adjustment controls are difficult to reach and operate. In addition, the weight of the projector must sometimes be supported by the operator when the stand is unlocked, thereby increasing the difficulty in making the proper adjustments. This problem is especially acute to an inexperienced operator who is not expecting the weight of the projector when the locking controls on the prior art stackers are released. Thus, the prior art stacker which adjusts the pitch, roll and yaw of a projector is difficult and time consuming to use.

SUMMARY OF THE INVENTION

It is an aspect of the present invention to provide an adjustable stacking stand for supporting one or more visual image projecting devices which may be easily and quickly adjusted. Another aspect of the present invention is such a stand in which the weight of the projection device is balanced allowing easy adjustment thereof.

The present invention comprises a stacking stand for adjustably supporting at least one visual image projection device relative to a screen. The stacking stand comprises a support member and a support frame for carrying and supporting the projection device. Means are provided for pivotably mounting the support frame on the support member for rotation about a single pivot point. This pivoting means or mounting means is configured to allow rotation of the projection device and the support frame about at least pitch and roll axes relative to the screen. All of these axes are mutually perpendicular to one another. In addition, fastening means are provided for releasably locking the support frame relative to the support member along the pitch and roll axes. This allows an image projected from the projection device to be superimposed with a target image appearing on the screen by a rotary adjustment of the support frame about the aforementioned axes. Furthermore, the support frame mounting means preferably allows rotation of the support frame about a yaw axis for further adjustment of the projection device, the yaw axis being perpendicular to the pitch and roll axes.

BRIEF DESCRIPTION OF THE DRAWINGS

The present invention will be described in detail hereafter in a Detailed Description taken in conjunction with the following drawings, in which similar numbers will refer to similar elements throughout.

FIG. 6 is a perspective view of a second embodiment of a slider block for use in the stacking stand of the present invention, the slider block being shown in exploded form for the purposes of illustration;

FIG. 7 is a perspective view of the slider block shown in FIG. 6, the slider block being shown in assemblied form for engaging the support member of the stacking stand of the present invention; and FIG. 8 is a perspective view of a second embodiment of a support frame for use in the stacking stand of the present invention.

DETAILED DESCRIPTION

Figure 1:
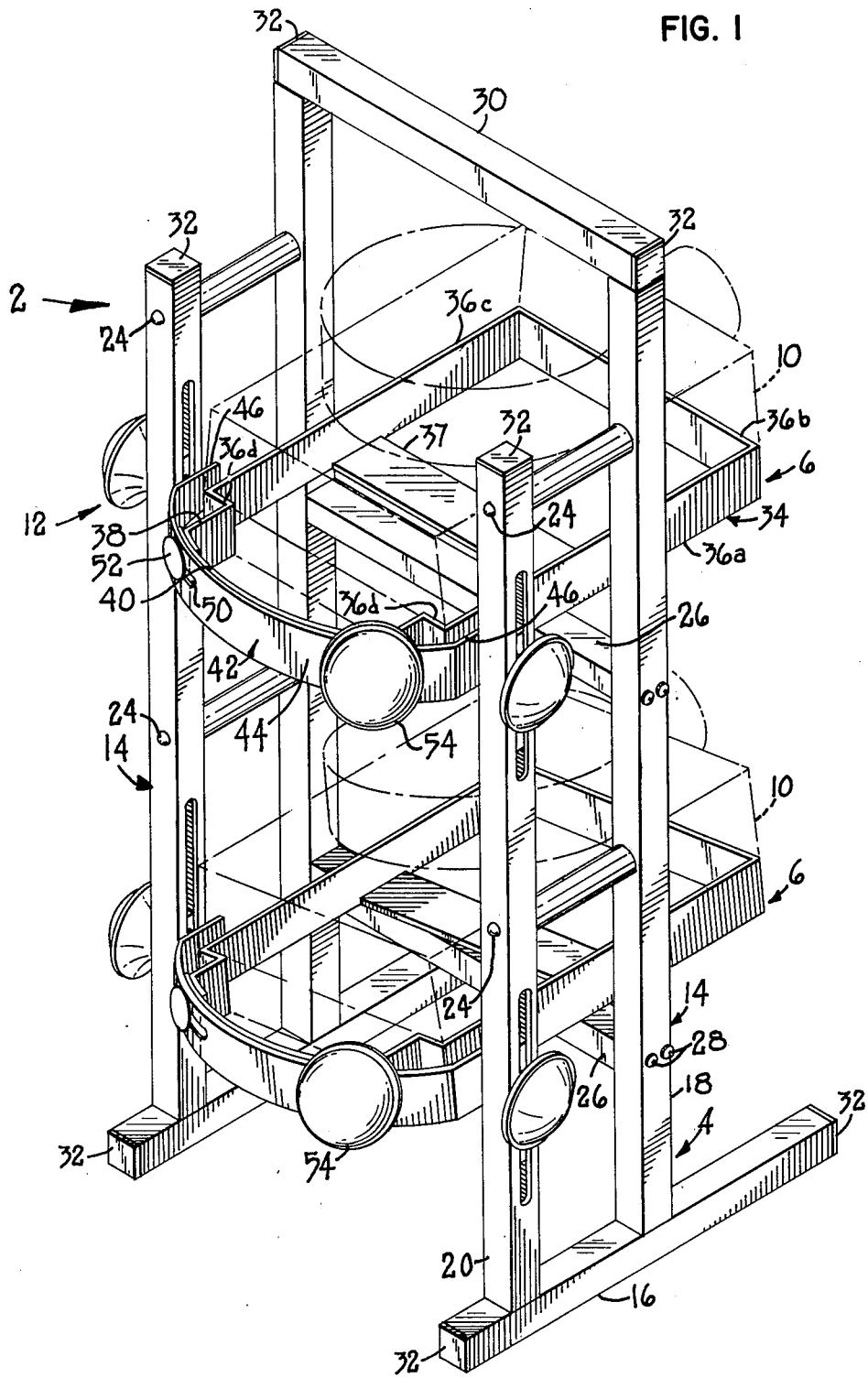
FIG. 1 is a perspective view of a stacking stand according to the present invention.

Referring first to FIG. 1, a projector stacking stand according to the present invention is generally indicated as 2. Stacking stand comprises a support member 4. A plurality of support frames 6 are rotatably mounted by a mounting means 8 (FIGS. 2-4) on support member 4. Each of the support frames 6 carries and supports a visual image projection device, generally indicated in phantom in the drawings as 10. A fastening means 12 is provided for adjustably holding or locking each of the support frames 6 relative to support member 4 in various adjusted positions.

Each of the visual projection devices 10 preferably comprise slide projectors or similar devices. Projectors 10 are conventional types of projectors having a body, a lamp source, and means for inserting slides between the lamp source and a lens for projecting an image onto a screen. More specifically, each of the projection devices 10 preferably comprise Kodak Ektagraphic or Carousel slide projectors, manufactured by the Eastman Kodak Company. Other types and brands of slide projectors may, however, also be carried by stacking stand 2. Although stacking stand 2 is primarily meant for use with slide projectors, the principles of this invention may also be used to support any type of visual image projection device relative to a screen.

Stacking stand 2 supports each slide projector 10 in a spaced relationship in front of a screen or other image reflecting medium. One of the projectors 10 will project an image onto the screen which may be known as the target image. The area of the screen which is covered by the target image may be referred to as the target area. It is the purpose of the present invention to allow the other projectors 10 carried on stacking stand 2 to have their images adjusted to be superimposed onto the target area. Stacking stand 2 is thus particularly adapted for use in multi-image and single-screen dissolve presentations.

The Support Member

Support member 4 comprises two transversely spaced side members 14. Side members 14 are transversely spaced apart a sufficient distance such that each of the support frames 6 along with the slide projectors 10 carried therein may be received between the side members. Side members 14 are identically shaped. Therefore, a description of one side member 14 will also described the other side member 14.

Side member 14 comprises a longitudinally extending base member 16 consisting of a rectangular beam. A front upright 18 and a rear upright 20 are rigidly secured at their lower ends to base member 16 and extend vertically upwardly therefrom. As shown in FIG. 1, front and rear uprights 18 and 20 are longitudinally spaced apart along base member 16. A plurality of spacer rods 22 extend between the front and rear uprights 18 and 20 to maintain the uprights in their longitudinally spaced orientation and to further reinforce support member 4. Spacer rods 22 may be secured to the front and rear uprights 18 and 20 by longitudinally extending pin or threaded bolts 24 which screw into the spacer rods.

Two substantially rectangular beam members 26 rigidly extend between the front uprights 18 of each side member 14. Beam members 26 are vertically spaced apart and are releasably interconnected to front uprights 18 by screws 28 or similar attachment means. Front uprights 18 are longer than rear uprights 20 and extend to a position above the uppermost slide projector 10 held in the upper support frame 6. A top piece 30 comprising a rectangular beam is connected to the ends of the front uprights 18. Top piece 30 serves as a handle by which stacking stand 2 may be lifted and moved. Rectangular caps 32 close the open upper ends of the rear uprights 20, as shown in FIG. 1. Such caps also close the ends of top piece 30 and base members 16.

All of the major components of support member 4, i.e. base member 16, the uprights 18 and 20, the cross beams 26 and top piece 30, preferably comprise rectangularly shaped, hollow tubing which is rigidly interconnected as described above to form a rigid support frame 4. All of the tubing is suitably made of metal or the like and may have a chrome, anodized or other decorative finish provided thereon. Base member 16 has a sufficient length so that support member 4, when placed in an upright position and carrying a number of projectors 10 thereon, will be stable. In other words, base members 16 are sufficiently long to prevent support member 4 from tipping over even when two or more projectors 10 are carried thereon.

The Support Frame

Each of the support frames 6 is shaped to carry and support one side projector 10. Each support frame 6 comprises a projector cradle 34. Cradle 34 has a plurality of integrally interconnected sides 36a–d which conform to the shape of the base of slide projector 10 and fit underneath a lip on the projector case. The sides 36a–d are shown in FIG. 1 as forming a rectangle to match the rectangular configuration of the base of projector 10. A cross piece 37 extends between two opposed sides 36a and 36c of cradle 34 to reinforce the cradle. In addition, two L-shaped brackets 38 are integrally formed with the rear side 36d of projector cradle 34 and extend rearwardly therefrom. Each of the L-shaped brackets 38 has a transversely extending flange 39 which is fixedly secured, as by welding, to a curved bow or bow portion 40. Bow 40 extends vertically and is spaced by brackets 38 from the rear side 36d of projector cradle 4, as shown in FIG. 1.

Each support frame 6 further comprises a yoke 42 which is attached to projector cradle 34 along the bow 40. Yoke 42 includes a vertically extending curved portion 44 which has an angular arc or configuration to match that of the curve in bow 40. Two forwardly extending flanges 46 are connected to either end of curved portion 44 to define the outer ends of yoke 42. Flanges 46 will be suitably attached to the fastening means 12 by which support frame 6 is locked relative to support member 4 in a manner to be described herafter. For this attachment to fastening means 12, each of the flanges 46 mounts an outwardly projecting ball stud or pin 48 thereon.

Yoke 42 is provided with two substantially horizontally elongated slots 50, only one of which is shown in FIG. 1. One of the slots 50 has retaining pin or screw 52 received therein. Pin 52 projects through one of slots 50 and is fixedly secured to bow 40 for retaining the bow 40 on yoke 42. However, since the slot 50 is elongated, the projector cradle 34 may be moved relative to yoke 42 at least in the direction of slot 50. A threaded handle 54 passes through the other slot 50 (not shown) and is threadedly received in a hole (not shown) provided in bow 40. Handle 54 includes a surface which bears against the outer surface of yoke 42 as the handle 54 is tightened. As handle 54 is tightened, the threaded portion of the handle which engages bow 40 will draw the bow into a frictional locking engagement with the adjacent yoke 42. Therefore, handle 54 comprises a projector cradle locking member which holds bow 40 in various adjusted positions relative to yoke 42 for purposes to be described hereafter.

All of the support frames 6 mounted on support member 4 are substantially identically shaped as shown in the drawings. However, some variation in the shape of projector cradle 34 would be necessary if stacking stand 2 were designed to mount different types of slide projectors 10 on different support frames 6. For example, the sides 36a-d of one projector cradle 10 might have the form shown in FIG. 1 to mount a projector 10 having a rectangualar base. However if a projector 10 having a different base configuration (e.g. hexagonal) were mounted on the other support frame 6, then the sides 36a-d of that support frame 6 would have to conform to that base configuration to properly mount projector 10 thereon. However, for the Kodak projectors 10 noted before as preferred for use with stacking stand 2, a semirectangular configuration of sides 36a-d will suffice.

The Mounting Means

Figure 2:
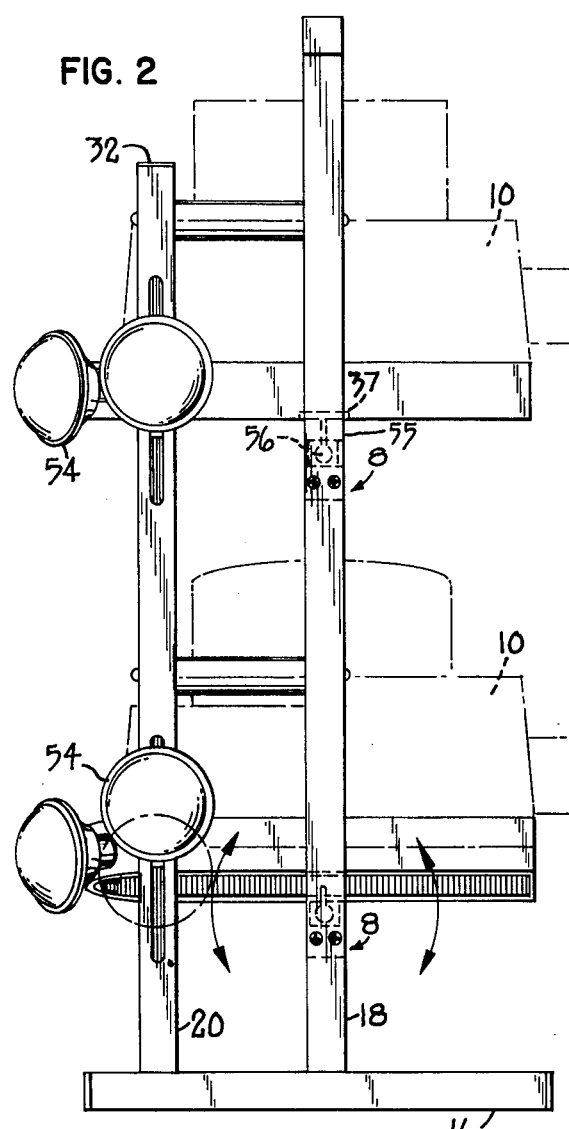
FIG. 2 is a side elevational view of the stacking stand shown in FIG. 1.
Figure 3:
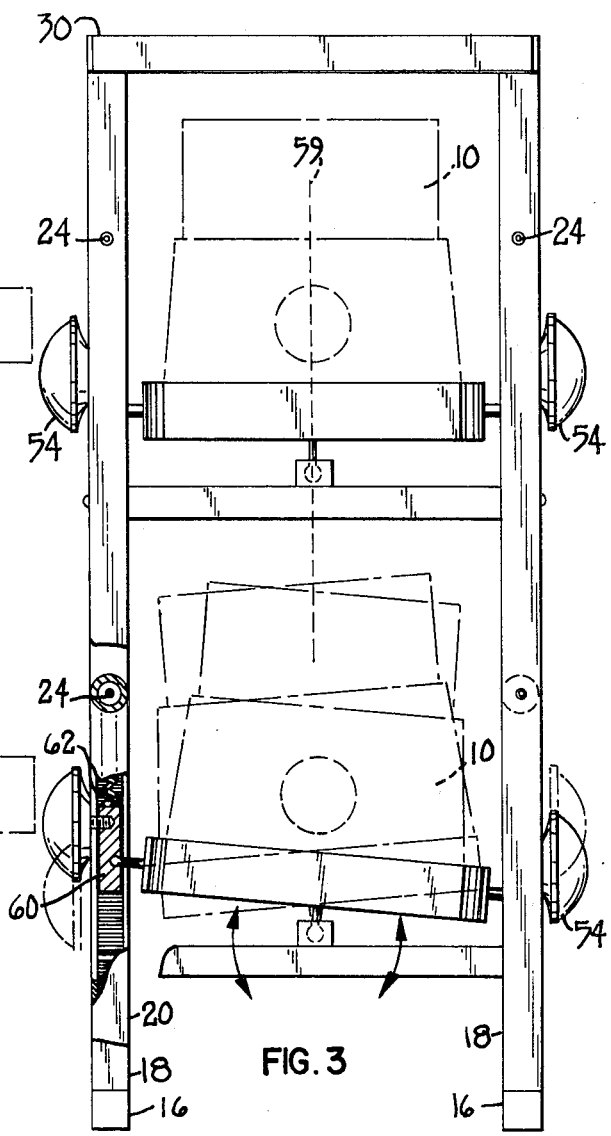
FIG. 3 is a front elevational view of the stacking stand shown in FIG. 1, having a portion thereof broken away and shown in cross-section.
Figure 4:
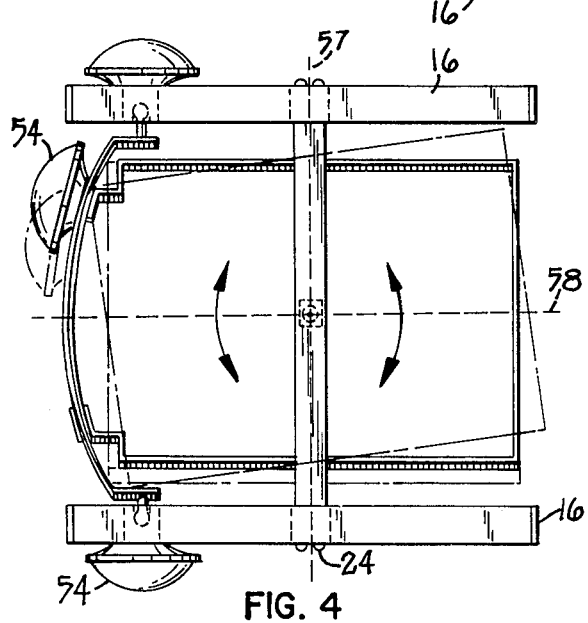
FIG. 4 is a bottom elevational view of the stacking stand shown in FIG. 1.

Referring now to FIGS. 2-4, each of the support frames 6 is rotatably mounted by an identical mounting means 8 for a pivotal movement relative to support member 4. Mounting means 8 comprises a ball and socket pivot joint which extends between support frame 6 and support member 4. More particularly, each of the cross beams 26 mounts a cylindrical, upwardly extending hollow socket member 55 thereon. Socket member 55 receives a downwardly projecting ball 56 fixedly mounted to the cross piece 37 on cradle 34. Therefore, each of the support frames 6 is mounted for rotation relative to support member 4 about a single pivot point defined by the coaction of ball 56 in socket 55. The positions of socket 55 and ball 56 could be reversed between the support frame 6 and support member 4 if so desired.

The desired mounting means 8 for each support frame 6 gives each support frame 6 freedom of rotation about three axes which pass through the pivot point defined by ball 56. These pivot axes will be respectively preferred to as the pitch, roll and yaw axes, as shown in FIGS. 2-4. The pitch axis, generally indicated as 57, comprises a substantially horizontal axis which passes transversely through ball 56. Adjustment of support frame 6 about the pitch axis 57 results in the front of the support frame 6 being vertically elevated or lowered about the ball and socket pivot joint, as shown in FIG. 2. The roll axis, generally indicated as 58, comprises a horizontal axis passing longitudinally through the pivot point defined by the ball 56. Adjustment of support frame 6 about the roll axis 58 comprises a leftward or rightward tilting motion of the support frame 6, as shown in FIG. 3. Finally, the yaw axis, generally indicated as 59, comprises a vertically extending axis passing downwardly through the pivot point defined by ball 56. Adjustment of the projector cradle 34 about the yaw axis results in a horizontal or swinging adjustment of the cradle 34 as shown in FIG. 4. Thus, the pitch, roll and yaw axes define three mutually perpendicular axes. This terminology is of the same type as used in aerodynamics to denote the motion of an aircraft in its three degrees of freedom. Various other terminology could be used to define the pitch, roll and yaw axes, such as the X, Y and Z axes.

In any event, each of the support frames 6 is mounted by the ball and socket pivot point for rotation in three degrees of freedom. Furthermore, each ball and socket pivot joint is located on the cross piece 37 of projector cradle 34 at a position near the center of mass of the projector 10 when projector 10 is supported inside the support frame 6. Thus, the weight of each projector 10 in support frame 6 is substantially balanced on the ball and socket pivot joint. This allows an operator to more easily adjust the support frame 6 about its pivot joint since the operator does not have to bear the entire weight of projector 10 during an adjustment operation.

The Fastening Means

Each support frame 6 must be locked relative to support member 4 to hold projector 10 steady relative to the screen (not shown). In this regard, a fastening means 12 is provided for each support frame 6. Fastening means 12 comprise a pair of opposed slider blocks 60 which respectively support each support frame 6 in the rear upright 20 for a vertical sliding movement therein. Since the slider blocks 60 are identical, description of one will also serve as a description of the other.

Each slider block 60 is shaped to be received inside the hollow upright 20. A tension spring 62 is rigidly connected between the upper surface of slider block 60 and the screw 24 which retains the spacer rod 22 located immediately above the slider block. Spring 62 biases slider block 60 upwardly. Thus, when the slider blocks 60 are being moved inside the uprights 20, the weight of support frame 6 and projector 10 is partially supported by spring 62 to help the operator more easily adjust projector 10. In addition, each of the rear uprights 20 has a vertically elongated slot 64 and 66 located in the inner and outer sides of the upright 20 adjacent the position of each slider block 60. Slots 64 and 66 provide access to each slider block 60 for the purpose to be described hereafter.

Figure 5:
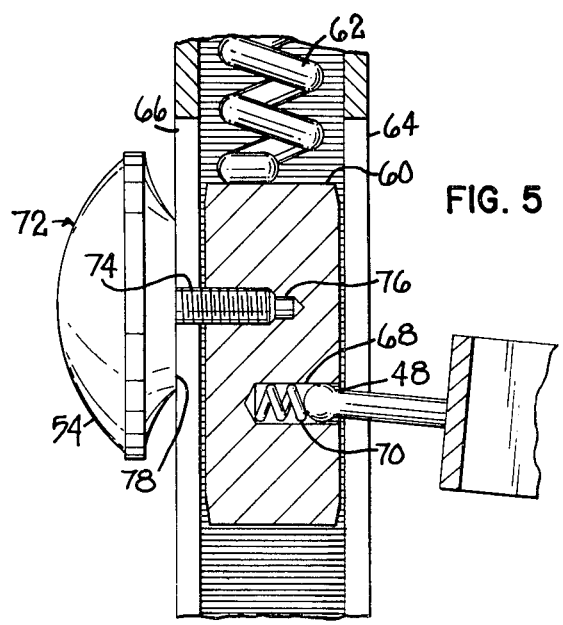
FIG. 5 is a cross-sectional view of a portion of the stacking stand shown in FIG. 1, illustrating the side member and the slider block contained therein.

Each slider block 60 has a first aperture 68 extending inwardly from the inner surface of the block, as shown in FIG. 5. Aperture 68 relatively loosely receives one of the ball studs 48 on the yoke 42 of support frame 6. A helical compression spring 70 is located between the end of ball stud 48 and the end surface of aperture 68 to spring load the ball stud 48 and center the yoke 42 between the opposed slider blocks 60. In addition, a plurality of slider block locking members comprising locking handles 72 are provided for releasaby fixing the position of slider blocks 60 inside uprights 20. Each of the handles 72 includes a threaded shaft 74 extending through slot 66 which is rotatably received in a threaded aperture 76 in slider block 60. In addition, each of the handles 72 has a thrust surface 78. Thrust surface 78 bears against the outside surface of the upright 20 adjacent slot 66 therein. Thus, when the handle 72 is rotatably turned or tightened, threaded shaft 74 draws the slider block 60 into a locking engagement with the inner surface of the outer side of the upright 20. The handles 72 are thus tightened until each of the slider blocks 60 are locked or fixed in an adjusted position inside the vertical uprights 20. The projector cradle locking handle 54 is preferably of the same type as locking handles 72.

As each support frame 6 is adjusted around the pitch and roll axes 57 and 58, the ball studs 48 on support frame 6 will also be angularly moved about these axes. Suitable provision must be made for accomodating those movements of ball studs 48 so that the slider blocks 60 do not bind inside the upright 20. Adjustment about the roll axis 58 can be easily accomodated simply by the rotation of the ball stud 48 inside apertures 68 in conjunction with a slight inward or outward movement of the ball studs 48 therein. Adjustment about the pitch axis 57 is accomodated by slightly undersizing the slider blocks 60 in the longitudinal direction of the upright 20. Thus, slider blocks 60 can be moved longitudinally inside the upright 60 a sufficient degree to accomodate the angular range of pitch adjustment which is desired. Since the yaw adjustment is carried on the support frame 6 itself, no binding of the blocks 60 can occur during a yaw adjustment since the blocks 60 remain stationary as will be described in more detail hereafter.

Use of the Stacking Stand

In using stacking stand 2 after it has been assembled, suitable slide projectors 10 are placed firmly into each of the support frames 6. Projector 10 may be simply dropped into the projector cradle 34 since cradle 34 has a plurality of sides 36a–d which conform to the base of the projector 10 and engage a lip on the projector case. One of the projectors 10, e.g., the projector 10 on the top support frame 6, serves to project a target image onto a screen spaced in front of stacking stand 2. The other projector 10 must then have its image aligned or superimposed with the target area on the screen defined by the target image.

Each support frame 6 superimposes the image of the projector 10 carried therein with the target area by a suitable rotary adjustment of the support frame along the pitch, roll and yaw axes 57–59. Taking the adjustments of the projector 10 about the pitch and roll axes 57 and 58 first, such adjustments may be simultaneously or individually made by suitable movement of the slider blocks 60 inside uprights 20. for example, both of the slider block locking handles 72 are loosened thereby freeing the slider blocks 60 for vertical movement inside the uprights 20. If both od the handles 72 on either side of the support frame 60 are then moved upwardly or downwardly in unison, adjustment of the projector support frame 6 about the pitch axis 57 will be achieved. In other words, moving the handles 72 upwardly or downwardly at an equal rate will simply cause the front of the projector 10 to be tilted or pitched downwardly or upwardly, respectively, relative to the pivotal mounting means 58. To adjust the support frame 6 about the roll axis 58, it is only necessary to raise or lower one of the slider blocks 60 relative to the other slider block, as shown in phantom in FIG. 3. This relative movement between the slider blocks 60 contained in the upright 20 will result in a leftward or rightward tilting or rolling of the support frame 6 about the roll axis 58.

Consequently, each of the support frames 6 is adjustable about the pitch and roll axes 57 and 58 by unlocking the handles 72 and adjusting the vertical position of the slider blocks 60 in the uprights 20. Both the pitch and roll adjustments may be made simultaneously by the coordinated and simultaneous movement of the slider blocks 60 after the slider block locking members, e.g. handles 72, have been released. In addition, each projector cradle 34 may be rotated about the yaw axis 59 by means of an adjustment provided on each of the support frames 6 itself. The yaw adjustment may be made either before or after the pitch and roll adjustment, but is preferably made after.

The yaw adjustment referred to above is made by loosening the threaded locking handle 54. This unlocks the projector cradle 34 for a sliding adjustment movement relative to the yoke 42. As shown in FIG. 4, the projector cradle 34 may be rotated or swung about the yaw axis 59 to align and perfect the alignment of the projected image on the target area. When the handle member 54 is retightened, the bow 40 of projector cradle 34 is then locked relative to yoke 42 in a new position to effectively secure projector cradle 34 in an adjusted position about the yaw axis 59.

Stacking stand 2 according to the present invention quickly and effectively aligns images created by one projector 10 with those of another. Once the projector images have been superimposed, the tightening of all the handles 54 and 72 firmly locks the support frame 6 to the support member 4 along both the rear uprights 20. In addition, support frame 6 is also firmly supported by the ball and socket pivot joint.

Stacking stand 2 has been illustrated throughout as being used to mount two projectors with one of the projectors serving to project a target image on the screen and the other projector having its image aligned thereto. Although this is preferred, various other modifications of stacking stand 2 are obvious. For example, an add-on unit could be provided to add additional projectors 10 on top of the two shown in the drawings. Such an add-on unit could comprise extensions for the uprights 18 and 20 which may be added after the top piece 30 and caps 32 have been removed therefrom. In such an embodiment, the length of the base member 16 would have to be sufficiently long to provide sufficient stability for the number of units desired to be added to stacking stand 2.

In addition, it is only necessary for stacking stand 2 to adjustably support one projector 10 thereon. The projector 10 which provides the target image on the screen could be one which is separate from stand 2 and is supported on a desk or other flat surface. In such an arrangement, after the target image is projected onto the screen, the projector 10 mounted on stand 2 would then be aligned by suitable adjustment about the pitch, roll and yaw axes 57-59. Furthermore, the yaw adjustment means would not itself have to be carried by the support frame 6 in such an embodiment. For example, stacking stand 2 could comprise only the slider blocks 60 for adjusting only the pitch and roll of the support frame 6. The yaw adjustment of the support frame 6 could then be adjusted simply by manually moving or shifting the entire stacking stand 2 on the surface on which it is supported. Alternatively, the stacking stand 2 could be mounted on a rotatable turntable or the like to effect the yaw adjustment by moving or shifting the entire stand 2. However, it is preferred that the yaw adjustment be provided by the coaction between the yoke 42 and the projector cradle 34 of the support frame 6.

Alternative Embodiment of FIGS. 6 and 7

In FIGS. 6 and 7, an alternative form of the fastening means 12 used to move and lock the support frame 6 to the vertical uprights 20 of support member 4 is generally disclosed as slider blocks 80. Slider blocks 80 act as a substitute for or an equivalent to the slider blocks 60.

Referring to FIGS. 6 and 7, each of the slider blocks 80 comprises a hollow outer frame 82. Outer frame 82 has an inner frame member 84 and an outer frame member 86. Inner and outer frame members 84 and 86 are rigidly connected together by front and rear end plates 88. A plurality of bolts 90 or similar threaded securing means 90 rigidly connect end plates 88 to frame members 84 and 86. In addition, the rearmost end plate 88 is longer than the front end plate 88 and has a threaded nut 92 attached to its inner surface adjacent the bottom thereof.

First and second suspension blocks 94 and 96 are pivotably journaled inside the outer frame 82 by means of a shaft 98. Shaft 98 is fixedly received and aligned in holes or bores 100 provided in frame members 84 and 86. Suspension block 94 has a chamber 102 therein which receives the suspension block 96 therein when slider 80 is assembled. Thus, suspension block 94 might be referred to as an outer suspension block and block 96 as an inner suspension block. In addition, outer suspension block 94 has an aperture 104 which loosely receives one of the ball studs 48 provided on support frame 6. Ball stud 48 extends through a cut-away portion 106 in the inner frame member 84 to be suitably received in the aperture 104. In addition, a compression spring 108 identical to the spring 70 is received in the aperture 104 to spring load and center the ball stud 48 therein.

Inner suspension block 96 rotatably mounts a shaft 110 thereon. Shaft 110 fixedly carries two opposed spools 112 having a flanged outer portion 113. Spools 112 are fixed to shaft 110 such that they are positioned on either side of suspension block 96. The opposed spools 112 form, in effect, a flanged roller which is adapted to engage the exterior configuration of the upright 20 as shown in FIG. 7. More particularly, the flanged portions 113 of the spools 112 engage the edges of the upright to rollably support the slider block 80 therein. In addition, shaft 110 extends outwardly through the outer frame member 86 and terminates in an outer handle 114. Handle 114 may be rotatated manually to move slider block 80 up and down the upright 20.

A compression spring 116 is received in a rearwardly opening aperture 118 in inner suspension block 96. Spring 116 extends rearwardly from aperture 118 and through the chamber 102 in block 94 to bear against outer frame 82. The purpose of spring 116 is to bias block 96 forwardly to engage the roller formed by the spools 112 with the vertical upright 20. Spring 116 is of sufficient force to firmly hold the roller in engagement with upright 20 such that the roller formed by spools 112 will hold slider block 80 in an adjusted position along the upright by friction. However, to more securely lock the slider block 80 to the upright 20, a friction locking member 120 may be used in conjunction with spring 116.

Friction locking member 120 is mounted on the end of a shaft 122. Friction locking member 120 is made of any material having a high coefficient of friction, such as rubber. The outer end of shaft 122 has a threaded portion 124 which can carry a nut 126 thereon. Shaft 122 is shaped to be inserted through the rear end plate 88 with the threaded portion 124 of the shaft 122 being engaged by the nut 92 attached to the inside surface of plate 88. A handle or thumbscrew 128 on the outside end of shaft 122 is used for moving the friction member 120 inwardly and outwardly relative to upright 20. Other locking members and/or devices for moving friction member 120 could be used.

In using sliding blocks 80, each slider block is assembled as shown in FIG. 6 with the vertical upright 20 extending therethrough as shown in FIG. 7. When it is desired to readjust the position of slider block 80 on upright 20, shaft 122 is rotated to release friction member 120 from engagement with upright 20. When the roller handle 114 is then actuated, the roller formed by spools 112 will travel upwardly or downwardly relative to the upright 20. When a new desired position is reached, the locking shaft 122 is rotated until friction member 120 abuts against the upright 20 in a locking position.

By virtue of the roller engagement with the upright 20, a more precise positioning of the slider block 80 and support frame 6 relative to the uprights 20 may be achieved as compared to the slider blocks 60 shown in FIGS. 1-5. In the previous embodiment, the positioning of the slider blocks 60 is dependent on how accurate one can manually move and adjust the slider blocks 60 inside the uprights. This is often difficult to do especially over small degrees of adjustment. A much more precise adjustment is available by means of the roller formed by the spools 112 which, in effect, forms a micrometer type adjustment. This adjustment is desirable especially when the projectors 10 are spaced at large distances from the screen since a small adjustment error at the projector yields a large error of the image at the screen. Although it is much easier to precisely adjust the position of the slider blocks with the roller shown herein, either form of the slider blocks 60 or 80 may be used in stacking stand 2 according to the present invention.

The Embodiment of FIG. 8

An alternative embodiment for the bow and yoke portions of each support frame 6 is shown in FIG. 8. In this alternative embodiment, the bow 140 is horizontally oriented, rather than being vertically oriented in the manner of bow 40. Bow 140 is fixedly secured at its outer ends to the L-shaped brackets 38 on projector cradle 34. The yoke 142 has a horizontal portion 144 underlying the bow 140. The outer ends of the yoke 142 are defined by upwardly extending flanges 146 which mount the ball studs 48 that are received in the slider blocks 60 or 80. A forwardly projecting arm 148 is mounted to the center of yoke 142. Arm 148 has a bore 150 for being loosely journaled around the stem of the ball 56. The rear end of arm 148 is fixedly connected to the yoke and receives a threaded locking handle 152. In addition, a plurality of elongated slots 154 are provided in bow 140 for receiving a plurality of flat headed retaining members 156.

The manner of effecting the yaw adjustment for the alternative embodiment of support frame 6 is generally similar to that described before. Locking handle 152 may be loosened until it no longer lockingly engages the bow 140. The bow may then be moved or rotated relative to yoke 142 to affect the yaw adjustment of the projector cradle 34 about the yaw axis. After the adjusting movement has been made, locking handle 152 is retightened to secure the bow 140 relative to the yoke 142 in the new adjusted position.

An advantage of the type of support frame shown in FIG. 8 over that shown in FIGS. 1-5 is that a high degree of concentricity is not needed between the yoke and bow portions. More particularly, when the bow and yoke are oriented vertically relative to one another, as is the case for the bow and the bow 42, their curves must be precisely formed in order to allow a smooth pivoting movement of the bow 40 relative to the yoke 42. Such concentricity may be difficult to achieve with certain materials, such as aluminum, used to construct the support frame 6. Therefore, the embodiment of FIG. 8 by placing the bow 140 vertically relative to the yoke 142 is able to achieve the same pivoting movement without difficulty in achieving the require degree of concentricity. However, either of the embodiments disclosed herein for support frame 6 may be used to mount the projectors 10.

Various other modifications will be apparent to those skilled in the art. For example, a rack and pinion engagement could be used between the uprights and the flanged roller formed by the opposed spools 112, if so desired. Therefore, the scope of the invention is to be limited only by the appended claims.

I claim:

1. A stacking stand, suitable for adjustably supporting at least one visual image projection device in a spaced relationship relative to a screen, which comprises:
    (a) a support member, wherein the support member comprises two transversely spaced side members;
    (b) a support frame for carrying and supporting the projection device, wherein the support frame has two outwardly projecting pins each of which are located proximate to one of the side members;
    (c) means for pivotably mounting the support frame on the support member for rotation about a single pivot point on the support member, the mounting means being configured to allow rotation of the support frame relative to a screen around at least a pitch axis and a roll axis, the pitch and roll axes being substantially perpendicular to one another; and
    (d) fastening means for releaseably locking the support frame on the support member in various adjusted positions along the pitch and roll axes, whereby a visual image projected from the projection device onto the screen may be superimposed with a target area on the screen by a rotary adjustment of the projection device along the pitch and roll axes, and wherein the fastening means includes:
        (i) slider blocks independently and movably carried on each of the two side members for a vertical sliding movement relative thereto, each of the pins being received in one of the slider blocks to support the support frame thereon; and
        (ii) slider block locking members for releasably holding the slider blocks in adjusted positions along the side members, whereby the position of the support frame may be adjusted about the pitch and roll axes by adjusting the vertical position of each of the slider blocks relative to the side members.

2. A stacking stand, suitable for adjustably supporting at least one visual image projection device in a spaced relationship relative to a screen, which comprises:
    (a) a support member;
    (b) a support frame for carrying and supporting the projection device;
    (c) means for pivotably mounting the support frame on the support member for rotation about a single pivot point on the support member, the mounting means being configured to allow rotation of the support frame relative to a screen around at least a pitch axis and a roll axis, the pitch and roll axes being substantially perpendicular to one another;
    (d) fastening means for releasably locking the support frame on the support member in various adjusted positions along the pitch and roll axes; and
    (e) wherein the support frame includes means for adjusting the projection device about a yaw axis, the yaw axis being mutually perpendicular to both the pitch and roll axes, wherein the support frame comprises:
        (i) a projector cradle for receiving the projecting device therein;
        (ii) a yoke carried with the projector cradle, the yoke being movably mounted relative to the projector cradle about the yaw axis and being fixed relative to the projector cradle about the pitch and roll axes, the yoke having transversely spaced outer ends which are attached to the fastening means to allow the pitch and roll adjustment of the support frame by adjustment of the ends of the yoke; and
        (iii) projector cradle locking means extending between the yoke and the projector cradle for locking the projector cradle relative to the yoke in various adjusted positions about the yaw axis, whereby a visual image projected from the projection device onto the screen may be superimposed with a target area on the screen by a rotary adjustment of the projection device along the pitch, roll, and yaw axes.

3. A stacking stand as recited in claim 2, in which the mounting means comprises a ball and socket pivot joint which defines the pivot point.

4. A stacking stand as recited in claim 3, in which the ball and socket pivot joint is located on the support frame near the center of mass of the projection device when the projection device is being carried by the support frame, whereby the weight of the projection device is substantially balanced on the ball and socket pivot joint to allow easy adjustment of the projection device.

5. A stacking stand as recited in claim 1, in which the pins comprise ball studs received in apertures in the slider blocks, and in which a compression spring extends between each stud and the aperture in which it is received to center the stud therein.

6. A stacking stand as recited in claim 5, in which the side members comprise hollow, vertically extending uprights which are shaped to receive the slider blocks therein, each of the uprights having an inner surface provided with a vertically elongated slot through which the corresponding ball stud extends to be received in the slider block, and wherein the slider block locking members are configured to draw the slider blocks into a locking engagement with the uprights in which they are received upon locking of the slider block locking members.

7. A stacking stand as recited in claim 6, in which the slider blocks are spring biased upwardly to help support the weight of the projection device during adjustment of the support frame.

8. A stacking stand as recited in claim 5, in which each of the slider blocks includes:
 (a) an outer frame;
 (b) at least one suspension block pivotably mounted in the outer frame, the suspension block carrying a rotatably mounted roller thereon, the roller being shaped to rotatably engage a portion of the corresponding side member;
 (c) a handle member for rotating the roller so that it rollably moves up and down the side members to accurately vary the position of the slider block relative thereto; and
 (d) means for locking the position of the outer frame relative to the side member.

9. A stacking stand as recited in claim 8, in which the locking means of each slider block comprises a biasing means extending between the outer frame and the suspension block, the biasing means having a sufficient biasing force for pressing the roller into a locking engagement with the side member to hold the outer frame in position thereon by friction.

10. A stacking stand as recited in claim 9, in which the locking means further comprises a friction member which bears against the side member in a locking position, the friction member having a threaded adjusting means connected to the outer frame for engaging and disengaging the friction member with the side member.

11. A stacking stand as recited in claim 8, in which the side members comprise two vertically extending uprights each having an exterior surface, and in which the outer frame of each slider block has a bore for matingly receiving one of the uprights therein such that the slider block is positioned around the exterior surface of the upright; and in which the suspension block is positioned to one side of the upright to allow the roller to engage the exterior surface thereof.

12. A stacking stand as recited in claim 2, in which the projector cradle has a substantially vertical, curved bow portion, and in which the yoke has a substantially vertical portion with a configuration matching that of the curved bow portion, the bow portion being movably positioned adjacent to the yoke for rotary adjustment about the yaw axis.

13. A stacking stand as recited in claim 2, in which the projector cradle includes a substantially horizontal bow portion at the rear thereof, and in which the yoke has a substantially horizontal portion positioned vertically adjacent to the bow portion for a relative sliding movement therebetween to effect adjustment of the projector cradle about the yaw axis.

14. A stacking stand, suitable for adjustably supporting at least one visual image projection device in a spaced relationship relative to a screen, which comprises:
 (a) a support member;
 (b) a support frame for carrying and supporting the projection device;
 (c) a ball and socket pivot joint means for pivotably mounting the support frame on the support member for rotation in three degrees of freedom about the ball and socket pivot joint means, the ball and socket pivot joint means being configured to allow rotation of the support frame relative to a screen around pitch, roll, and yaw axes, the pitch, roll and yaw axes being substantially and mutually perpendicular to one another; and
 (d) fastening means for releasably locking the support frame relative to the support member in various adjusted positions along the pitch, roll, and yaw axes, whereby a visual image projected from the projection device onto the screen may be superimposed with a target area on the screen by a rotary adjustment of the projection device along the pitch, roll, and yaw axes.

15. A stacking stand, suitable for adjustably supporting a plurality of visual image projection devices in a spaced relationship relative to a screen, which comprises:
 (a) a support member;
 (b) a plurality of support frames for respectively carrying and supporting the plurality of visual image projection devices thereon, each support frame having a plurality of sides between which the visual image projection device is contained;
 (c) a plurality of ball and socket pivot joint means for pivotably mounting each of the respective support frames on the support member in a vertically spaced manner, the ball and socket pivot joint means being configured to allow rotation of each support frame relative to the screen about at least a pitch axis and a roll axis, the pitch and roll axes being mutually perpendicular to one another; and
 (d) fastening means for releasably locking each of the support frames relative to the support member in various adjusted positions along both the pitch and roll axes, the fastening means being located proximate to one or more sides of each support frame to allow easy access to the fastening means such that the vertical spacing between support frames can be minimized, whereby one of the projection devices projects a target image onto the screen which defines a target area to which images from the other projection devices are superimposed by rotary adjustment of the other projection devices along the pitch and roll axes.

* * * * *

UNITED STATES PATENT AND TRADEMARK OFFICE
CERTIFICATE OF CORRECTION

PATENT NO. : 4,148,453
DATED : April 10, 1979
INVENTOR(S) : Robert T. Brantly

It is certified that error appears in the above-identified patent and that said Letters Patent are hereby corrected as shown below:

In column 1, line 19, change "othe" to --other--.

In column 3, line 34, add --2-- after "Stacking stand".

In column 5, line 45, change "rectangualar" to --rectangular--.

In column 6, line 8, change "preferred" to --referred--.

In column 6, line 53, change "upright" to --uprights--.

In column 8, line 3, change "od" to --of--.
line 15, change "upright" to --uprights--.

In column 11, line 26, add --40-- after "the case for the bow".

Signed and Sealed this

Twenty-fourth Day of July 1979

[SEAL]

Attest:

LUTRELLE F. PARKER
Attesting Officer   Acting Commissioner of Patents and Trademarks